March 24, 1970     B. GULISTAN     3,502,130
CAPTIVE JACKING SCREW
Filed March 4, 1968     3 Sheets-Sheet 2
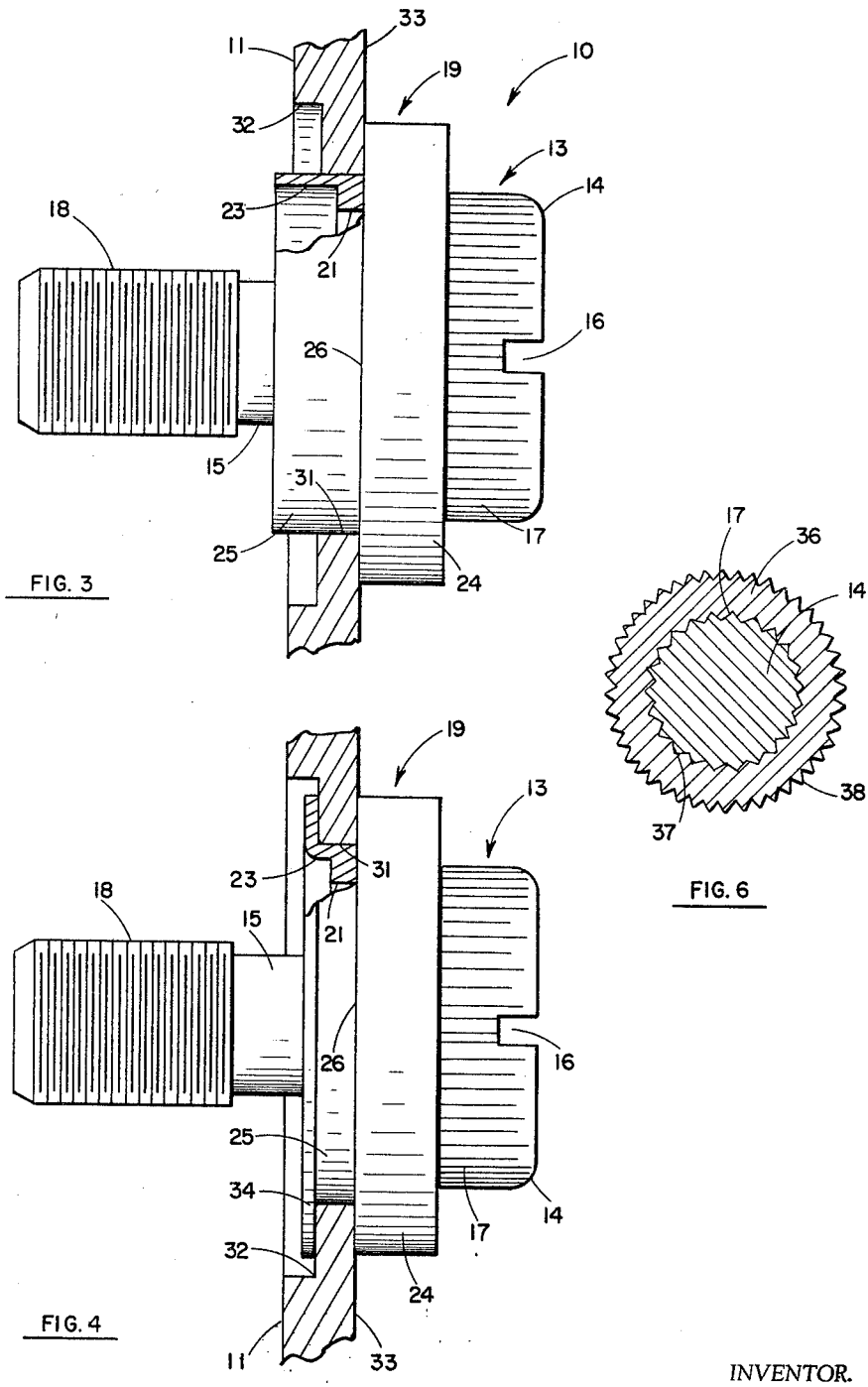
INVENTOR.
BULENT GULISTAN
BY
ATTORNEYS March 24, 1970  B. GULISTAN  3,502,130
CAPTIVE JACKING SCREW Filed March 4, 1968  3 Sheets-Sheet 3

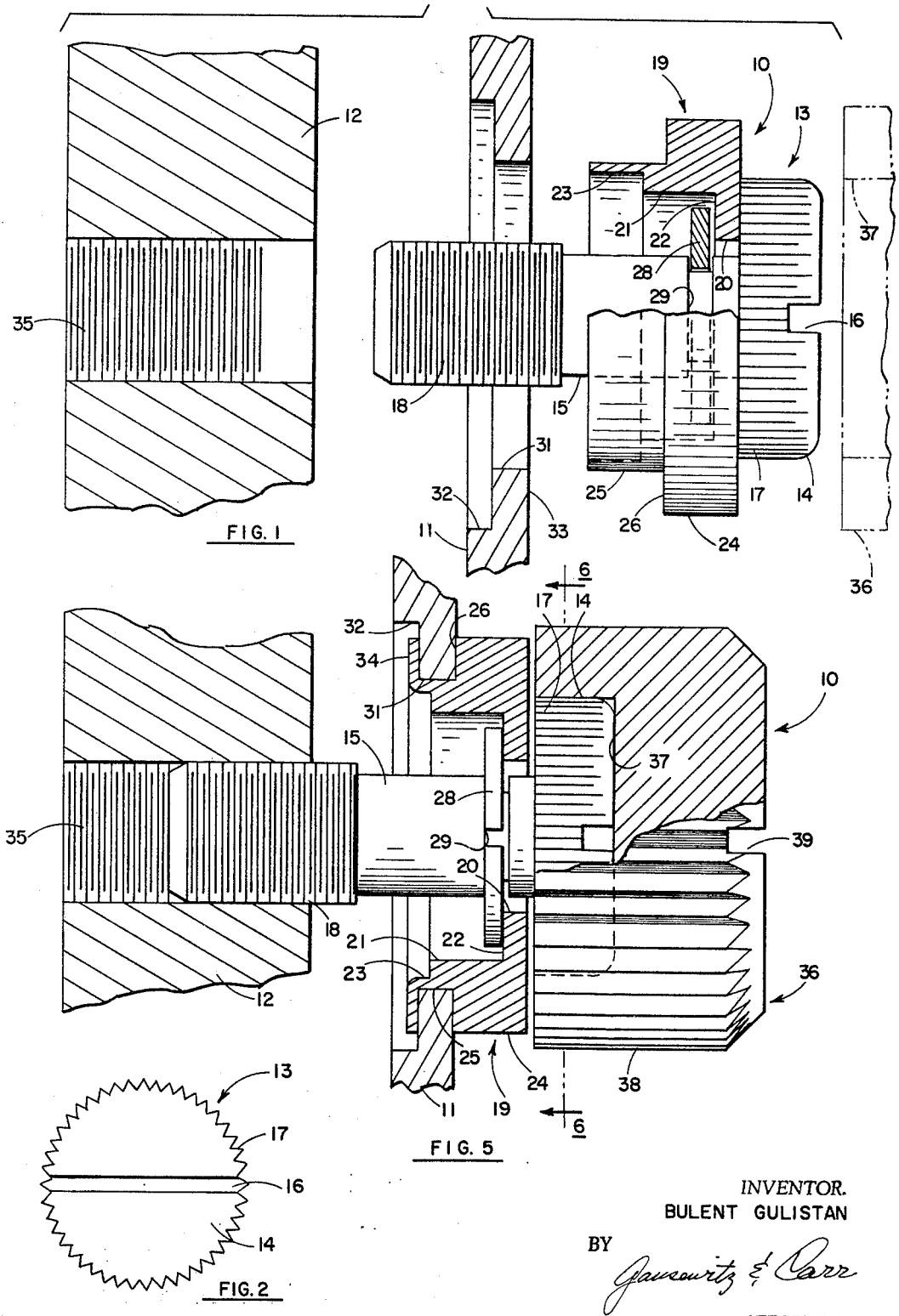

INVENTOR
BULENT GULISTAN
BY
ATTORNEYS

United States Patent Office 3,502,130
Patented Mar. 24, 1970

3,502,130
CAPTIVE JACKING SCREW
Bulent Gulistan, Malibu, Calif., assignor to Deutsch Fastener Corp., Los Angeles, Calif., a corporation of California
Filed Mar. 4, 1968, Ser. No. 710,294
Int. Cl. F16b 43/00, 19/00; B21d 39/00
U.S. Cl. 151—69                    2 Claims

ABSTRACT OF THE DISCLOSURE

A fastener including a collar secured to a part to be fastened by means of a shoulder and a bent-over flange, a screw extending through the collar, and a retainer ring recessed within the collar and mounted on the shank of the screw adjacent a collar surface so that the retainer cooperates with the screw head in holding the screw to the collar, and so that the screw does not move axially relative to the collar. Consequently, the fastener jacks the part with which it is associated away from the adjoining part when the fastener is loosened. The screw may have a larger auxiliary head having an opening receiving the normal screw head with a press fit.

BACKGROUND OF THE INVENTION

The field of the invention

This invention relates to a fastener that is retained by the part with which it is associated, and which operates to separate that part from an associated member when the fastener is loosened.

The prior art

It has been known in the past that fasteners, such as screws, may be retained to a workpiece and held in such a manner that when the fastener is loosened the workpiece will become separated from an adjoining part. An example is found in Patent 1,491,394, although the objective of that invention was to capture the screw rather than to separate the parts upon loosening of the fastener. Such prior devices require the shank of the screw to be extended through the workpiece, following which a retainer device is applied. Normally, this is done in the field at the time the fastener is to be utilized. In such designs, a U-shaped member serves as the retainer, fitting in a groove in the shank of the screw, after which it is necessary to pinch the ends of the retainer together to prevent the retainer from being lost from the screw. Thus, there has been some difficulty in installation of fasteners of this type because of the operations which must be performed when the fastener is applied to the workpiece. Particularly serious is the lack of complete assurance that the fastener will be retained to the workpiece and not separated during service conditions. The application of a retaining ring to the fastener in the field raises the danger that the fastener may not be held properly and will become lost at a future time. Such retainers are not protected and easily may become knocked loose from the screw during use and handling.

SUMMARY OF THE INVENTION

According to the present invention, a fastener is provided which is both securely held to the workpiece and which will function to separate the workpiece from the associated part when the fastener is loosened. The installation is simplified without the danger of an improper attachment. This is accomplished by a design in which the shank of the fastener extends through an opening in a collar to which it is held by a split retaining ring. This ring fits within a groove in the shank to cooperate with the head of the fastener to hold it to the collar. This operation is performed at the factory, so that a proper application of the retaining ring is assured. The retaining ring is buried within the collar, which protects it from being dislodged after it has been installed.

The collar has a shoulder adapted to engage one side of the workpiece and a cylindrical portion that extends through an opening in the workpiece. The outer end of the collar has a relatively thin wall permitting it to be bent outwardly to form a flange that overlaps the surface of the workpiece. This flange cooperates with the shoulder to hold the collar to the workpiece. Thus, the screw is held to the collar and the collar, in turn, is secured to the workpiece. The outward bending of the flange to hold the collar to the workpiece is accomplished very easily and without danger of the collar's later becoming loosened during service. The end of the shank extends beyond the collar and is adapted to engage the threaded opening of an adjacent workpiece.

When the fastener is loosened, it causes the part to which it is associated to become separated from the adjoining part. This arises because the retaining ring pushes outwardly on the collar when the fastener is loosened, and the collar, in turn, moves the part to which it is attached away from the other structure. Thus, an automatic separation of the parts is accomplished when the fastener is loosened.

In another embodiment of the invention, the retainer is continuous rather than being split, and is slid onto the screw shank before the shank is threaded. Threads then are rolled on the shank, increasing its diameter at that location so that the retainer ring cannot escape from the shank. When the fastener is in use and the screw is loosened, the threads push on the retainer ring as the screw shank is moved axially. The retainer ring thereby is caused to bear against the collar, which, in turn, moves the part with which it is associated to separate that part from the other to which attachment had been made.

To facilitate the rotation of the screw, it may be provided with an enlarged head, even though the shank is relatively small in diameter. The enlarged head may be a separate element having a recess and pressed over the normal head of the screw. This permits the fastener to have the large diameter at the head without the necessity for excessive machining in cutting away the screw blank to provide the shank with an appropriate diameter.

An object of this invention is to provide a fastener that will cause a separation of the associated parts when the fastener is loosened.

Another object of this invention is to provide a captive screw that will cause separation of the associated parts when it is loosened in which it is assured that the fastener will not become inadvertently loosened from the part during service.

An additional object of this invention is to provide a captive screw that will separate the parts with which it is associated when loosened that includes a simpler and more reliable means of attaching the device to one of the parts.

BRIEF DESCRIPTION OF THE DRAWING

FIGURE 1 is an exploded sectional view of the components of the invention prior to attachment of the collar to the workpiece;

FIGURE 2 is an end elevational view of the head end of the screw;

FIGURE 3 is a sectional view illustrating the fastener received in the opening in the panel prior to bending the flange to hold the collar to the panel;

FIGURE 4 is a sectional view with the fastener in the secured position;

FIGURE 5 is a view similar to FIGURE 4, but during the loosening of the fastener, illustrating the manner in which the fastener causes the parts to become separated;

FIGURE 6 is a sectional view taken along line 6—6 of FIGURE 4, showing the attachment of the auxiliary head member;

DESCRIPTION OF THE PREFERRED EMBODIMENTS

Figure 7:
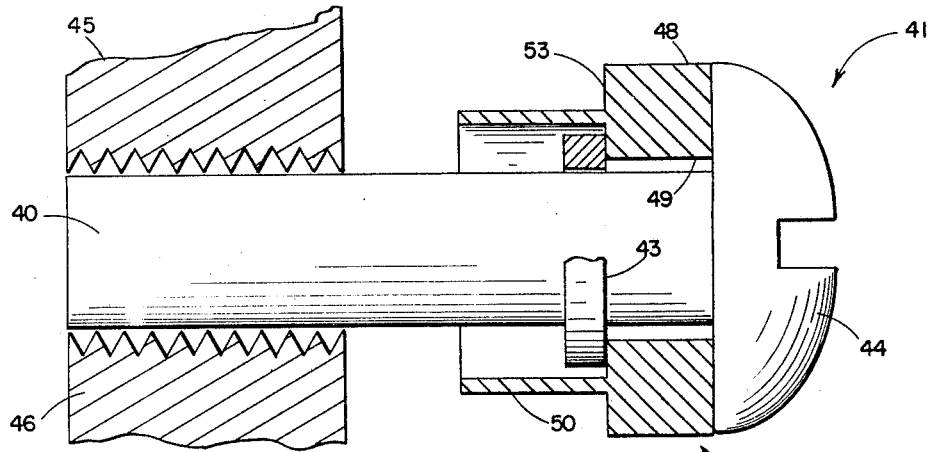
FIGURE 7 is a sectional view of an embodiment of the invention in which rolled threads are formed on the screw shank to hold the retainer ring to the screw, with the shank in condition for the formation of the threads thereon.

The fastener 10 of this invention is illustrated as used for joining a panel 11 to the structure 12. The fastener includes a screw 13 having a head 14 from which projects a shank 15. The head 14 includes a suitable driving recess, such as the slot 16, and its circumferential surface 17 may be knurled. The end portion 18 of the shank is threaded.

The shank 15 extends through a collar 19 and projects beyond it. The opening through the collar is in three portions of different diameters. The first and smallest part 20 is adjacent the head 14 of the screw. This connects to a larger part 21, with a radial wall 22 extending between these two portions of the bore. The outer end of the collar has a still larger bore portion 23 which provides the collar with a relatively thin wall at that location.

The exterior of the collar is cylindrical, with a larger portion 24 located adjacent the head 14 of the screw and a part of smaller diameter 25 at the other end. This provides the collar with a radial shoulder 26 between the exterior portions 24 and 25.

The screw 13 is held to the collar 19 by means of a split annular retaining ring 28. The inner portion of the retainer ring 28 fits within a recess in the shank provided by an annular groove 29 that is located a predetermined distance from the undersurface of the head 14. The groove 29 is spaced from the head a distance slightly greater than the length of the smaller diameter portion 20 of the collar bore. The retainer ring 28 is of larger diameter than the bore portion 20 of the collar, so that it extends outwardly alongside the radial face 22. Therefore, the retainer ring 28 cooperates with the undersurface of the head 14 to hold the screw 13 to the collar 19. With the retainer ring 28 being received in the bore section 21, it is buried in the recess provided by the bore so that it is protected from engagement with other objects subsequent to installation.

The portion 21 of the collar bore is made to a diameter that will allow the split retainer ring to be expanded sufficiently to fit over the shank as it is moved toward the groove 29 upon installation. The retainer ring 28 is fitted into the groove 29 at the factory so that the fastener 10 is furnished to the end user in the condition shown in FIGURE 1. Thus, there is no requirement for installing a split retainer member in the field when the fastener is to be used.

The panel 11 is provided with an opening 31 dimensioned to substantially complementarily receive the end portion 25 of the collar 19. A counterbore 32 may be provided at the end of the opening 31. The collar is correlated in dimension to the panel 11 such that the length of the opening 31 is less than that of the collar end portion 25. Also, the bore section 23 is made sufficiently deep to assure that the thin-walled end of the collar will project beyond the end of the opening 31. When the portion 25 of the collar 19 is extended through the opening 31, the radial shoulder 26 is brought into engagement with the surface 33 of the panel 11 as seen in FIGURE 3. After this, the thin-walled end portion of the collar 19 which projects beyond the opening 31 is bent outwardly to form a radial flange 34. Therefore, the flange 34 cooperates with the shoulder 26 in providing opposed abutments that hold the collar 19 to the panel 11. This is an operation effected quite easily and rapidly when the fastener 10 is to be used. The flanged connection resulting from this arrangement securely holds the collar to the panel 11 without danger of its becoming loosened. Vibrational forces and other loads applied to the parts will not cause the separation of the collar 19 from the panel 11. At the same time, the split retainer 28 cooperates with the head 14 to hold the screw 10 securely to the collar. This connection also will not be adversely affected by the vibrations and forces imposed on the parts during service. Thus, there is a firm connection between the panel and the collar and between the collar and the screw.

Moreover, the split retainer ring is submerged in the collar in the portion 21 of the bore. This means that it will receive no direct forces and will engage no other objects during use of the fastener. In other words, the retainer ring is protected by being buried within the collar of the fastener and is in no danger of being knocked off during the time that the fastener is used.

When the fastener is in the secured position of FIGURE 4, the threaded end 18 of the screw is received in the tapped opening 35 in the member 12. It holds the panel 11 to the member 12 by engagement of the head 14 of the screw with the collar 19 which, in turn, through the shoulder 26 bears against the panel 11 and draws it up against the member 12.

When the fastener is loosened, the panel 11 automatically is shifted away from the member 12 (see FIGURE 5). This comes about from the presence of the retainer ring 28 and the groove 29 in the shank of the screw. As the shank moves outwardly by loosening of the screw, it cannot substantially change its axial position relative to the collar 19. Instead, the retainer 28 bears against the radial wall 22 within the collar. This pushes outwardly on the collar as the fastener is loosened. The force is transmitted from the collar to the flange 34, which, in turn, moves the panel 11 away from the member 12. Thus, the separating force is transmitted from the shank to the retainer, from the retainer to the collar, and from there to the panel 11.

For ease in manipulating the screw 13, frequently it is preferred to have the head substantially larger than the head 13 that is integral with the shank 15. Obviously, the screw can be formed from a larger blank, so that a bigger head may be provided as the screw is machined. However, this requires a great deal of machining as the shank is cut down to the needed diameter. This is wasteful of material and time. The same effect is provided much more efficiently through the provision of a cap 36 applied to the head 14. The member 36 has a recess 37 in one radial surface which is dimensioned to receive the head 14 with a press fit. With the head 14 having a straight knurl, the teeth defined by the knurl become embedded in the material of the cap 36 which pressed into the opening 37 so that the member 36 becomes, in effect, integral with the remainder of the screw. This provides an enlarged head having a knurled cylindrical surface 38, which is grasped easily for rotating the screw. A driving slot 39 also is provided in the outer surface of the auxiliary head member 36.

Figure 8:
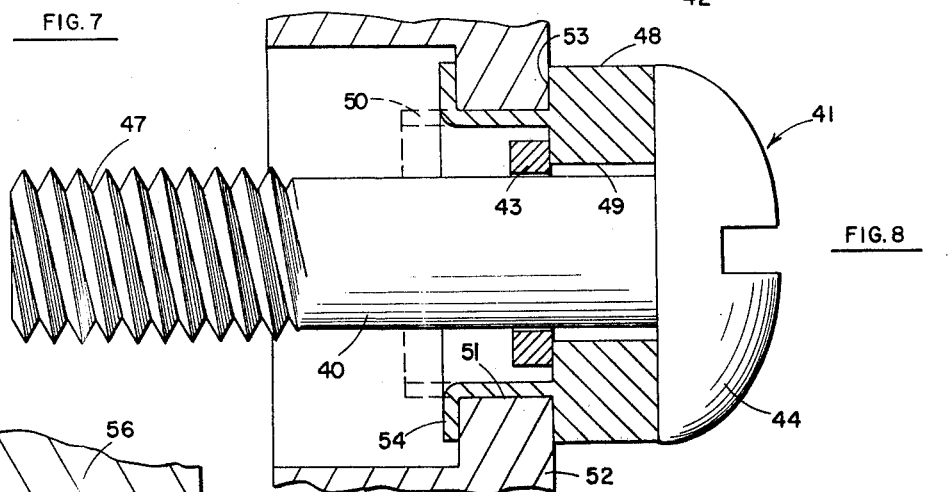
FIGURE 8 is a sectional view of the fastener of FIGURE 7 after completion and as attached to a part.
Figure 9:
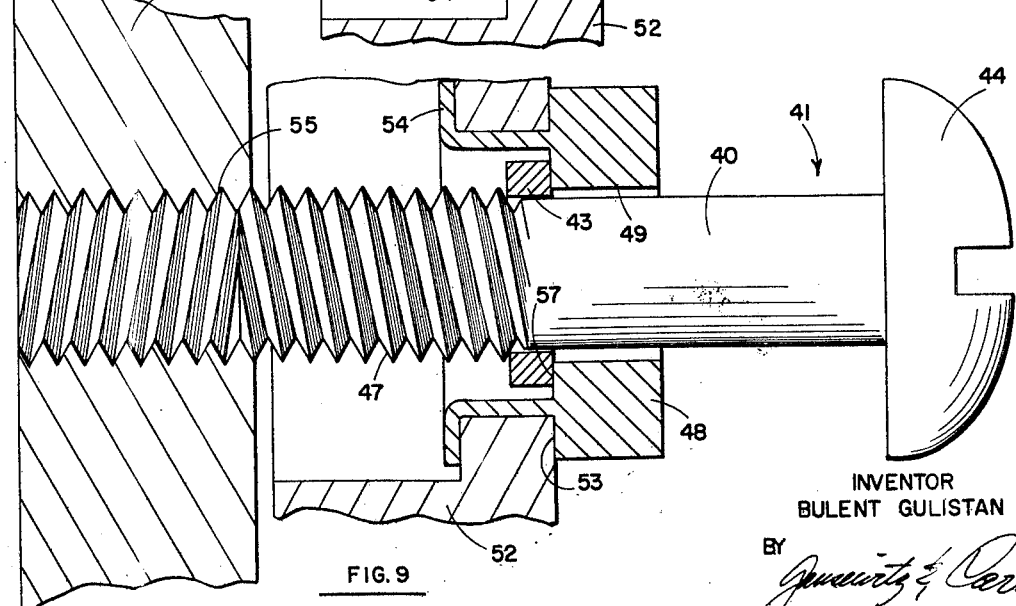
FIGURE 9 is a sectional view of the fastener of FIGURES 7 and 8 as it is being loosened and causes the parts to become separated.

In the embodiment of FIGURES 7, 8 and 9, the retaining ring is held to the screw shank by the threads of the screw, rather than being received in an annular recess as in the previously described arrangement. The shank 40 of the screw 41, which is longer than the collar 42, is extended through the collar 42 prior to the formation of threads on the shank, as indicated in FIGURE 7. After this, the retainer ring 43 is slid over the shank 40. This retainer ring is continuous, rather than being split, and has an inside diameter approximating that of the shank 40.

Then, with the shank 40 projecting beyond one end of the collar 42, and with the head 44 of the screw 41 in adjacency with the other end of the collar, threads are rolled on the distal end of the shank 40. This is accomplished by thread-rolling dies 45 and 46, which are brought into engagement with the shank 40 beyond the end of the collar 42. This produces the rolled threads 47 on the end of the shank seen in FIGURE 8. When the threads are rolled in this manner, they are given a major diameter greater than the diameter of the shank 40 prior to the time the threads were formed. This major diameter is greater than the remaining unthreaded portion of the shank and larger than the inside diameter of the retainer ring 43. Consequently, the retainer ring 43 cannot escape from the screw shank, nor can the screw become separated from the collar 42.

In use of the fastener of this embodiment, the collar is attached to the workpiece in the manner shown in FIGURE 8, which is generally the same as that described above. The collar 42 at the end adjacent the screw head 44 has a relatively thick wall provided by an enlarged outer surface 48 and a smaller bore 49 that slidably receives the screw shank 40. At the opposite end portion, the outside diameter is reduced and the inside diameter is increased to provide a thin-walled section 50 that is inserted through the opening 51 in the workpiece 52. The exterior abutment 53 of the collar, between the portions 48 and 50, is brought into engagement with the surface of the workpiece 52 at one end of the opening 51. The collar beyond the abutment 53 is longer than the opening 51 so that the end of the collar projects beyond the opposite end of the opening. The outer end of the thin-walled portion 50 then is bent outwardly to form a flange 54 overlapping the surface of the part 52 at the opposite end of the opening 51. The abutment 53 and flange 54 cooperate to retain the collar 42 to the workpiece 52.

In use of the fastener of this embodiment, when the screw 41 is loosened from the opening 55 in the mating part 56, the screw shank 40 is caused to move axially outwardly away from the part 56 (see FIGURE 9). This axial movement ultimately brings the inner end of the threads 47 into engagement with the retainer ring 43 within the thin-walled portion 50 of the collar that receives it. The threads cannot pass through the retainer ring 43, and so press the retainer ring 43 outwardly against the internal radial wall 57 between the thin-walled portion 50 and the bore 49. Therefore, the retainer ring 43 is caused to push outwardly on the collar 42 at the abutment formed by the wall 57, so that the collar, in turn, moves the part 52 away from the part 56. As before, therefore, there is an automatic separation of the parts when the fastener is loosened.

This arrangement has the advantage of a simple construction in which an unsplit retainer ring is used, the screw shank does not require an annular groove, and in which the retainer ring can never be dislodged from the screw. However, it requires sufficient axial travel of the screw shank 40 to bring the threads 47 into engagement with the retainer ring 43 prior to any forced separation of the parts 52 and 56. In the other embodiment of the invention, the separtion of the parts occurs almost immediately as the screw is loosened.

I claim:
1. A fastener comprising
   a sleeve, said sleeve having
      a first bore extending inwardly from one end thereof,
      a second and larger bore in an intermediate portion of said sleeve,
         said second bore connecting to said first bore so as to define a substantially radially extending surface at the juncture of said first and second bores,
      and a third bore extending inwardly from the opposite end of said sleeve and connecting to said second bore,
         said third bore being larger than said second bore and providing said sleeve at said opposite end with a relatively thin wall adapted to be bent outwardly to form a flange used in attaching said sleeve to a workpiece,
      said sleeve having an enlarged exterior diameter adjacent said one end for defining a shoulder engageable with a workpiece and cooperable with a flange bent outwardly at said opposite end in attaching said sleeve to such a workpiece,
   a screw,
      said screw having a head of larger diameter than and exteriorly of said first bore,
         said head being in juxtaposition with said one end of said sleeve,
      and a shank extending through said first, second and third bores and outwardly beyond said opposite end of said sleeve,
         said shank having a threaded distal end portion and an unthreaded portion inwardly thereof,
            said unthreaded portion being of substantially constant diameter and extending to said head,
         said shank having an annular recess in said unthreaded portion,
            said annular recess being in said second bore and in juxtaposition with said substantially radially extending sursurface,
   and a split annular member in said annular recess,
      said split annular member having an outside diameter greater than that of said first bore and smaller than that of said second bore so that said split annular member includes portions projecting radially out of said annular recess and in juxtaposition with said radially extending surface for cooperating with said head in precluding substantial axial movement of said screw relative to said sleeve.

2. In combination with a member having an opening therethrough, a fastener comprising
   a collar,
      said collar including an exterior shoulder intermediate the ends thereof,
         said shoulder engaging a surface of said member at one end of said opening,
         said collar beyond said shoulder extending through said opening,
         said collar having an exterior flange at one end thereof extending over said member at the opposite end of said opening for cooperating with said shoulder in retaining said collar to said member at said opening,
   a screw,
      said screw including a head in juxtaposition with the opposite end of said collar, and a shank rotatably extending through said
  collar to a location beyond said one end of
  said collar,
    said shank being remote from said member
      at said opening,
said collar including a first bore portion of a relatively small diameter adjacent said opposite end, and a second bore portion of a relatively larger diameter inwardly of said opposite end,
    said first and second bore portions being interconnected by a radially extending surface,
said collar at said exterior flange having a thinner wall than the wall of said collar at said first bore and at said second bore,
said shank including an annular groove therein,
    said annular groove being in juxtaposition with siad radially extending surface and spaced from said head a distance no less than the length of said first bore portion,
and a split annular element,
    said split annular element having a portion received in said groove
    and having a diameter greater than said first bore portion and less than said second bore portion,
        whereby said split annular element overlaps said surface of said collar,
        said split annular element thereby cooperating with said head to retain said screw to said collar and hold said screw against substanital axial movement relative to said collar.

References Cited

UNITED STATES PATENTS

| 1,251,676 | 1/1918 | McCaffray | 151—69 |
| 2,376,089 | 5/1945 | Savageau | 151—69 |
| 3,037,542 | 6/1962 | Boyd | 151—69 |
| 3,118,718 | 1/1964 | Babey | 151—69 |
| 3,138,188 | 6/1964 | Tuozzo et al. | 151—69 |
| 3,204,680 | 9/1965 | Barry | 151—69 |
| 3,255,799 | 6/1966 | Heimovics | 151—69 |

FOREIGN PATENTS

| 125,200 | 4/1919 | Great Britain. |
| 626,013 | 7/1949 | Great Britain. |
| 353,647 | 5/1961 | Switzerland. |

MARION PARSONS, Jr., Primary Examiner

U.S. Cl. X.R.

85—9; 29—512